United States Patent [19]
Buer

[11] Patent Number: 5,888,027
[45] Date of Patent: Mar. 30, 1999

[54] METHOD OF COLLECTING RECYCLABLE CONTAINERS FROM A REDEMPTION CENTER FOR SEPARATING AT A SEPARATING FACILITY

[76] Inventor: Jeffrey J. Buer, 657 Highway G-24, Norwalk, Iowa 50211

[21] Appl. No.: 882,486

[22] Filed: Jun. 25, 1997

[51] Int. Cl.⁶ .............................. B65G 53/40; B60P 1/60; B03C 1/00; B07B 1/22
[52] U.S. Cl. .......................... 406/122; 406/39; 209/930; 209/289; 209/215
[58] Field of Search ............................... 209/10, 38, 930, 209/567, 636, 215, 289, 12.1; 406/122, 108, 39, 41

[56] References Cited

U.S. PATENT DOCUMENTS

| | | | |
|---|---|---|---|
| 3,952,889 | 4/1976 | Wanker et al. | 406/39 |
| 4,440,284 | 4/1984 | DeWoolfson | 209/930 X |
| 4,579,216 | 4/1986 | DeWoolfson | |
| 5,116,486 | 5/1992 | Pederson | 209/12 |

FOREIGN PATENT DOCUMENTS

| | | | |
|---|---|---|---|
| 592.960 | 5/1959 | Italy | 406/41 |
| 632136 | 1/1962 | Italy | 406/41 |

OTHER PUBLICATIONS

Tectron Metal Detection, Brochure.

*Primary Examiner*—Boris Milef
*Assistant Examiner*—Joe Dillon, Jr.
*Attorney, Agent, or Firm*—Henderson & Sturm

[57] ABSTRACT

The present invention relates to an improved method of removing and transporting empty, recyclable, aluminum and plastic beverage containers returned to redemption centers without requiring the redemption centers to sort the containers by distributor and then separate the containers into like materials for removal. The present invention also illuminates the burden imposed on the distributors from having to pick up the containers from the redemption centers, then shred or bale the materials, and then sell the materials to recyclers. The invention comprises the steps of collecting and depositing the aluminum and plastic containers into a single holding bin at the redemption center's facilities. Using a blower such as a centrifugal fan and chute to blow the contents of the holding bin into a transporter such as a semi-trailer or compactor. Transporting the transporter to a separating facility which automatically separates the aluminum and plastic containers into like materials. Then delivering to a recycling facility the separated beverage containers, thereby eliminating the need for the distributors to pick up their beverage containers from the redemption centers for delivery to recyclers.

11 Claims, 8 Drawing Sheets

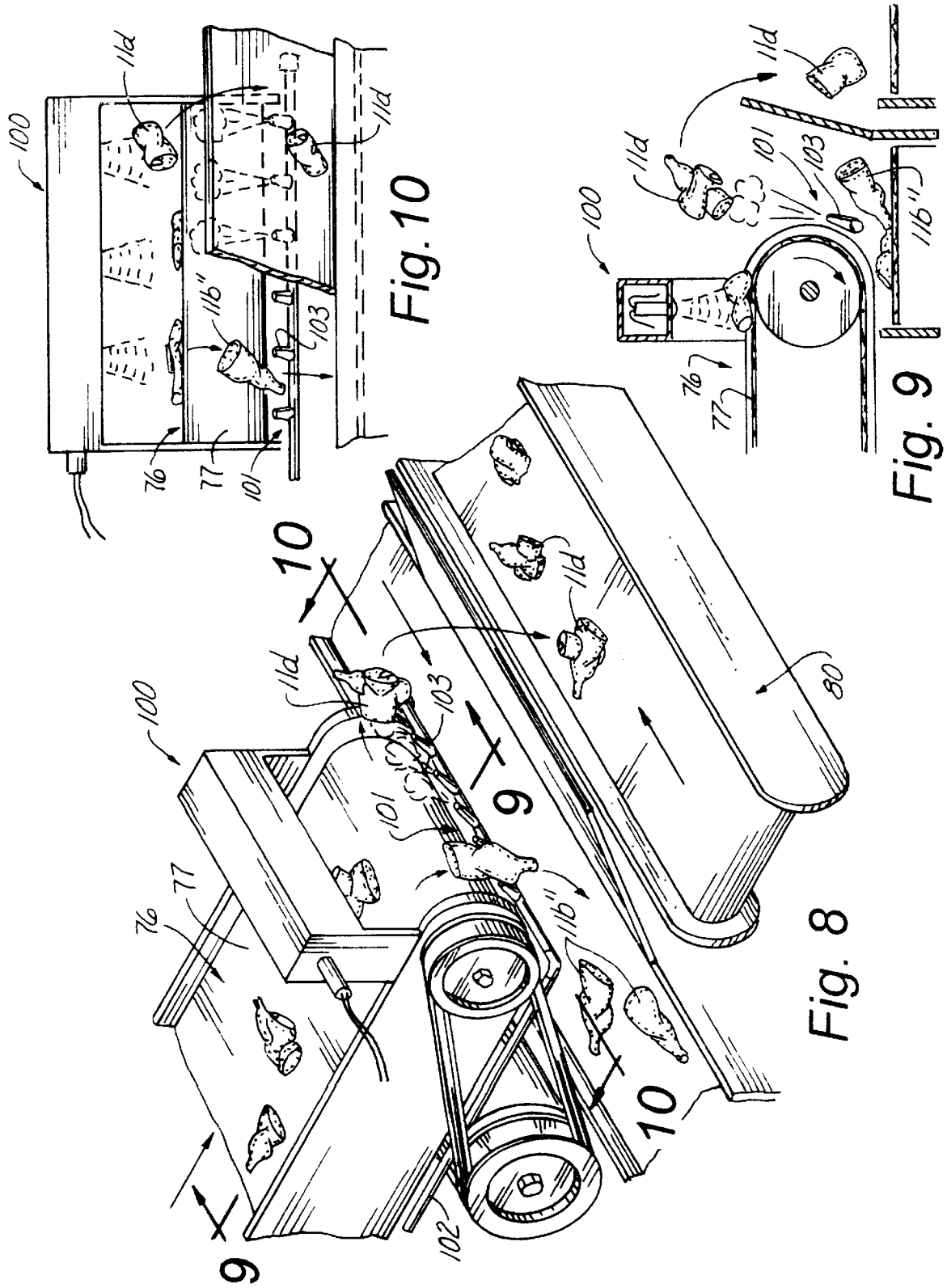

METHOD OF COLLECTING RECYCLABLE CONTAINERS FROM A REDEMPTION CENTER FOR SEPARATING AT A SEPARATING FACILITY

BACKGROUND OF INVENTION

Field of Application

The present invention relates to an improved method of collecting, removing and transporting aluminum and plastic beverage containers from a redemption center to a separating facility without requiring the redemption center to sort the beverage containers by specific beverage company or requiring the redemption center to separate the beverage containers into like materials. Additionally, the improved method relieves the beverage companies from the burden of having to remove the empty beverage containers from the redemption center.

DESCRIPTION OF PRIOR ART

Recyclable aluminum or plastic containers are used almost exclusively by beverage bottlers such as Coca Cola, Pepsi, Budweiser, etc. Many states, such as Iowa, Michigan, and others, have imposed statutory laws requiring the consumer to pay a deposit (usually five or ten cents) for each beverage container purchased from a dealer in order to encourage recycling of the containers. This deposit is then refunded when the consumer returns the recyclable container to a dealer or to a redemption center (both referred to hereinafter as redemption centers).

In states that impose this deposit requirement, the redemption centers are usually under a duty to accept the empty beverage containers and pay the amount of the refund value to the consumer upon return of the beverage containers. The distributors are then typically required to accept and pick up from the redemption centers any beverage containers of the kind, size and brand sold by the distributor and to reimburse the redemption centers for the containers collected. The distributors then shred and bale the empty beverage containers and sell the plastic and aluminum to recyclers.

Since the distributors are under a duty to accept and reimburse the redemption centers for only the kind, size and brand of the beverage containers which they sell, the redemption centers must sort the cans by distributor and by material type (i.e. aluminum or plastic). For example, the redemption centers must separate plastic Coke bottles from plastic Pepsi bottles and aluminum Coke cans from aluminum Pepsi cans. This imposition takes time and increases costs for the redemption centers.

In order to reduce costs and increase efficiency, the redemption centers have taken great measures to try to find ways of keeping track of each distributor's returned beverage containers as well as keeping the plastic and aluminum containers separate from the time they are returned by the consumer. One of the methods used by the redemption centers to keep the plastic and aluminum containers separate as well as track each distributor's returned beverage containers, is the use of reverse vending machines of the type disclosed in the patent issued to DeWoolfson et al, U.S. Pat. No. 4,579,216 which is incorporated herein by reference.

Reverse vending machines are similar to beverage dispensing vending machines except that instead of depositing coins and receiving a bottle or can of soda, the user deposits his or her empty plastic or aluminum beverage containers into the machine in return for money in an amount equal to the deposit. Other reverse vending machines merely return a receipt or voucher which the user must tender to an employee of the redemption center to collect his or her deposit.

Most reverse vending machines count the containers as they are being deposited and also read a bar code on the containers to determine the distributor. Separate reverse vending machines are usually required, each receiving only plastic or aluminum containers ranging in size from large two-liter plastic bottles to smaller twelve ounce bottles or cans. The plastic bottles and aluminum cans are collected in hoppers housed within the separate reverse vending machines. The hoppers must be emptied periodically into larger holding bins where the plastic bottles and aluminum cans remain separate at all times. The distributors then periodically haul away an equivalent number of bottles and cans from the recycling depository rather than just hauling away their own brand of bottles and cans.

Although the reverse vending machines have eliminated the need for the redemption centers to manually sort the beverage containers by distributors, these reverse vending machines are relatively expensive and they impose a burden on the consumer who must insert the cans and bottles into separate reverse vending machines one at a time, wait for a receipt, and then take the receipt to a clerk at the redemption center to receive his or her deposit refund. Further, the distributors are still required to pick up an equivalent number of returned beverage containers from the redemption centers.

Therefore, there is a need for a more efficient way to eliminate the burden and costs imposed on consumers and redemption centers to sort the recyclable beverage containers by distributor and then separate the containers into like materials. Additionally, there is a need to eliminate the burden on the distributors from having to pick up the empty beverage containers from the redemption centers, who must then have to shred and bale the materials, and then try to sell the materials to recyclers at the best market price.

BRIEF SUMMARY OF THE INVENTION

The present invention relates to a method of collecting and depositing the aluminum and plastic containers into a single holding bin at the redemption center's facilities. A blower, such as a centrifugal fan and chute, is used to blow the contents of the holding bin into a transporter such as a semi-trailer or compactor or other enclosed hauling vehicle. Alternatively, the containers can be dumped directly into a compactor. A transporter is used to transport the containers to a separating facility to automatically separate the aluminum and plastic containers into like materials. The separated materials are then delivered to a recycling facility, thereby eliminating the need for the distributors to pick up their beverage containers from the redemption centers for delivery to recyclers.

Therefore it is an object of the present invention to provide an improved method of removing and transporting empty, recyclable, aluminum and plastic beverage containers returned to redemption centers.

It is a further object of the present invention to eliminate the need for the redemption centers from having to sort the returned beverage containers by material type (i.e. aluminum and plastic).

It is still a further object of the present invention to eliminate the need for the redemption centers from having to sort the returned beverage containers by distributor.

It is still a further object of the present invention to eliminate the burden on the distributors from having to pick up the returned beverage containers from the redemption centers, then having to shred and bale the containers, and then having to try sell the materials to recyclers.

Other objects, advantages, and novel features of the present invention will become apparent from the following detailed description of the invention when considered in conjunction with the accompanying drawings.

BRIEF DESCRIPTION OF THE SEVERAL VIEWS OF THE DRAWINGS

FIG. 8 is a close up view of the end of the third conveyor showing the metal detector and air discharge device;

FIG. 9 is a cross-sectional view of the metal detector and air discharge device taken along lines 9—9 of FIG. 8.

FIG. 10 is a cross sectional view of the air discharge device taken along lines 10—10 of FIG. 8.

DETAILED DESCRIPTION OF THE INVENTION

Figure 1:
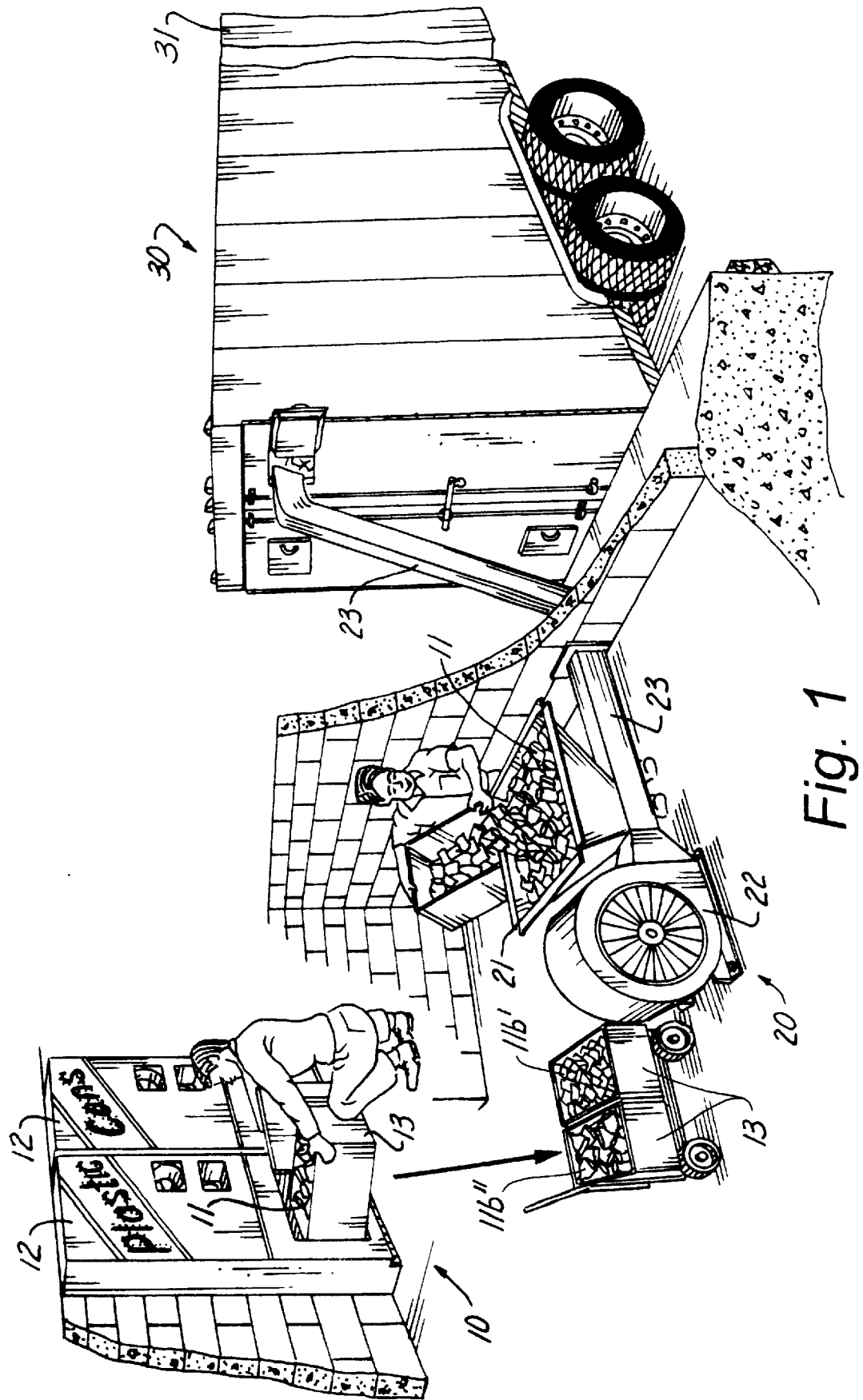
FIG. 1 illustrates a first embodiment of the improved method for collecting and removing recyclable aluminum and plastic beverage containers from a dealer or redemption center.

Referring now to the drawings wherein like reference numerals designate identical or corresponding parts throughout the several views, FIG. 1 shows a collecting area (10) typically located near a redemption center's facilities. An individual is shown removing recyclable beverage containers (11) from reverse vending machines (12) of the type disclosed, for example, in U.S. Pat. No. 4,579,216 to DeWoolfson et al. The recyclable beverage containers (11) are collected in hoppers (13) within the reverse vending machines (12). The recyclable beverage containers (11) are then carried to and deposited into a holding bin (21) connected to a blowing machine (20). The beverage containers (11) now within the holding bin (21) are blown by a centrifugal fan (22) through a chute (23) into a transporter (30). When the transporter (30) is full, it is transported to a separating facility (40) (see FIGS. 4 and 5) by a motor vehicle (31) where the beverage containers (11) are unloaded into a receiving bin (51). The empty transporter (30) is then returned to the redemption center's facilities to be filled with more recyclable beverage containers (11).

Figure 2:
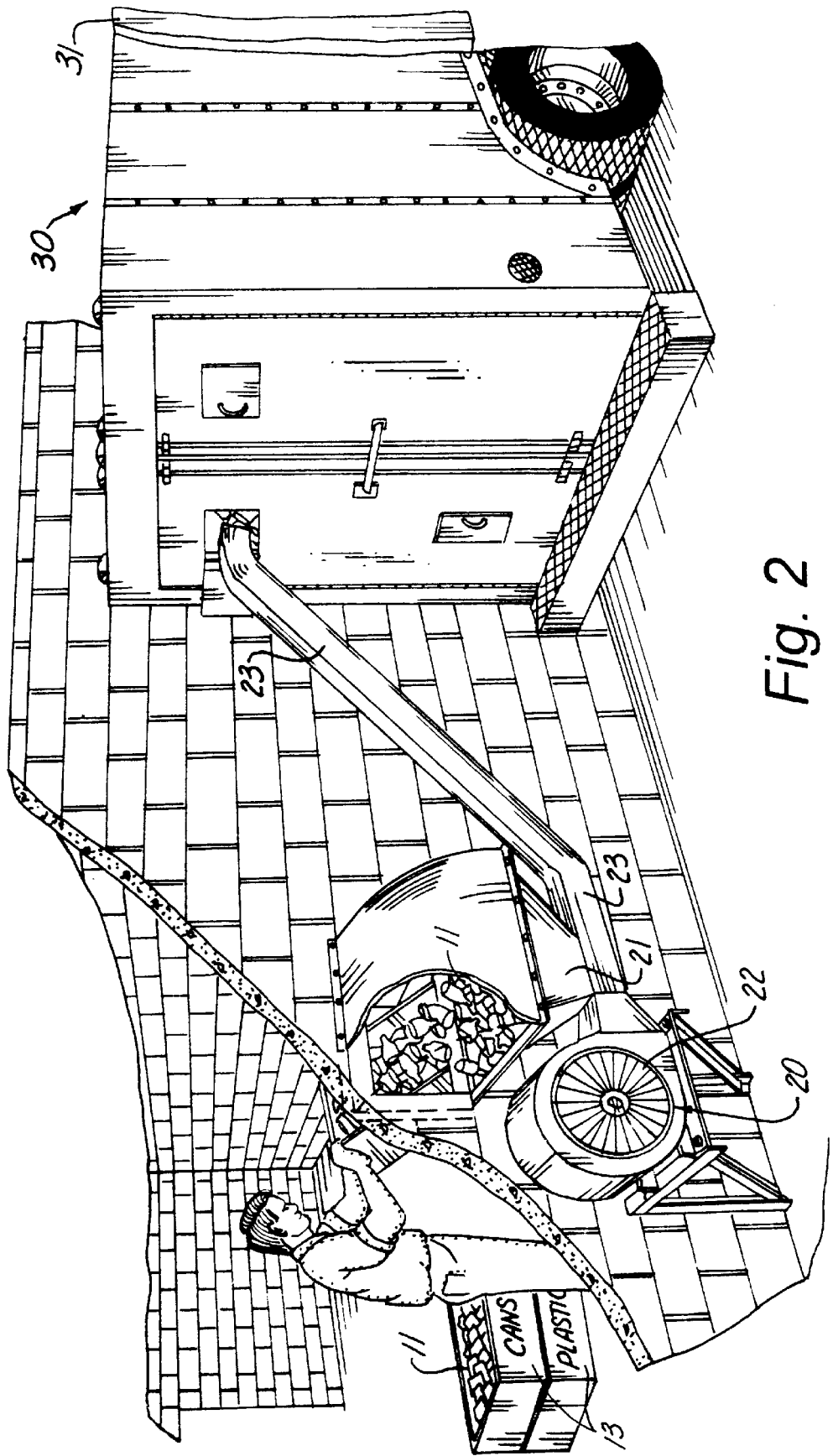
FIG. 2 illustrates a second embodiment of the improved method for collecting and removing recyclable aluminum and plastic beverage containers from a dealer or redemption center.
Figure 3:
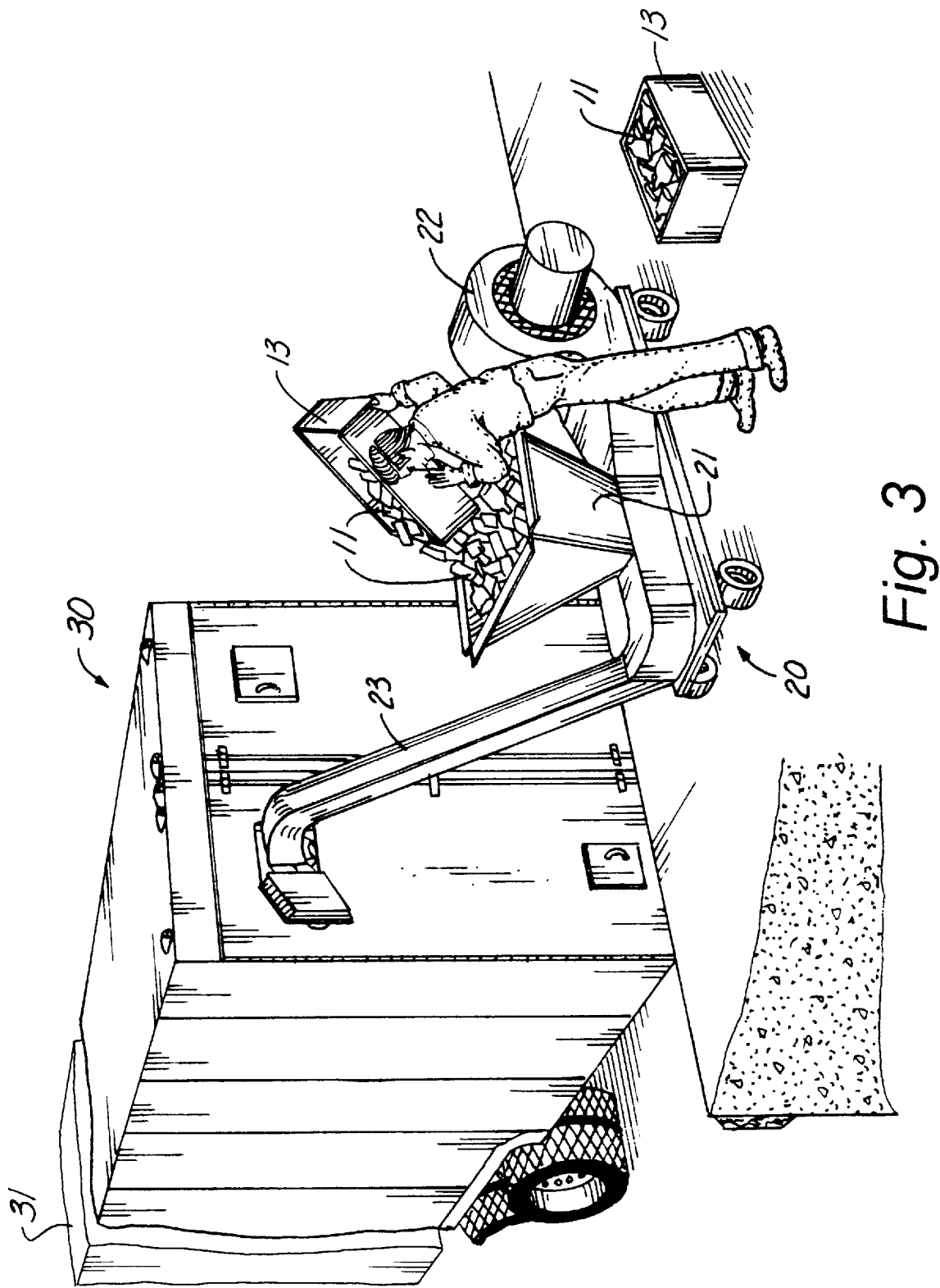
FIG. 3 illustrates a third embodiment of the improved method for collecting and removing recyclable aluminum and plastic beverage containers from a dealer or redemption center.

FIGS. 2 and 3 show alternative arrangements which may be found at the redemption center's facilities for depositing the beverage containers (11) into the holding bin (21) of the blowing machine (20). It should be understood that recyclable beverage containers (11) need not be collected by the reverse vending machines (12). The beverage containers (11) may be collected in any type of hopper (13) such as a sturdy box, or bag, or the beverage containers (11) can be directly deposited into the holding bin (21) by the consumers as the containers (11) are returned for redemption.

Figure 4:
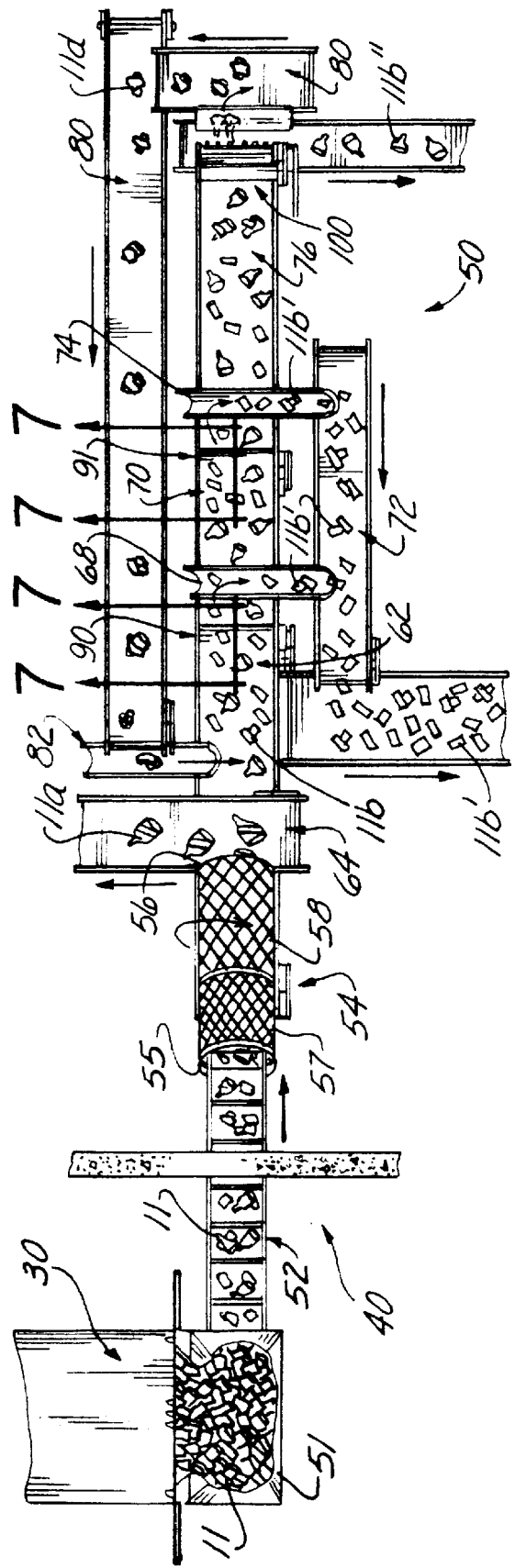
FIG. 4 is a plan view of the preferred apparatus used to separate the aluminum and plastic beverage containers at a separating facility.
Figure 5:
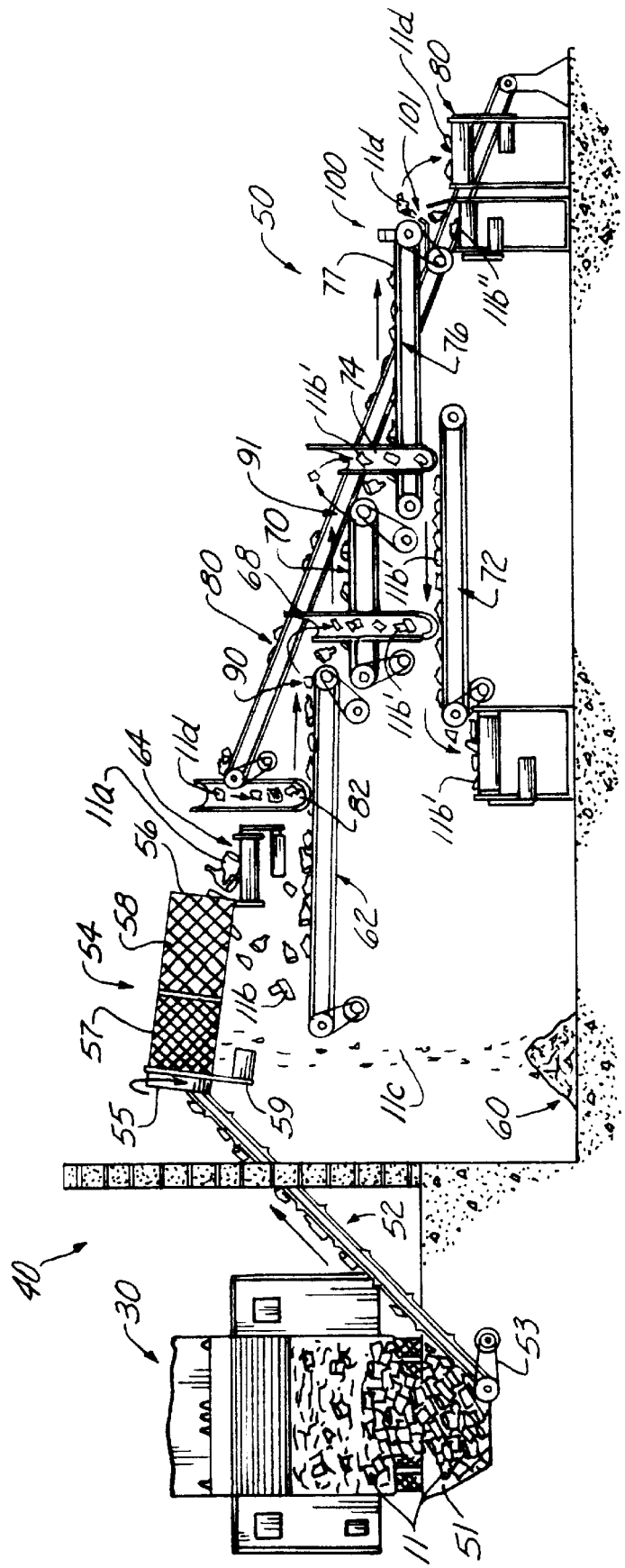
FIG. 5 is an elevation view of the preferred apparatus used to separate the aluminum and plastic containers at a separating facility.

Referring now to FIGS. 4 and 5 which show respectively a plan view and an elevation view of a separating apparatus (50) at a separating facility (40). The transporter (30) is shown unloading the recyclable beverage containers (11) consisting of containers of large size (11a), intermediate size (11b), and fine particles (11c), into a receiving bin (51). A conveyor (52), powered by an electric motor and belt (53), conveys the beverage containers (11) into a two-stage drum screen (54) of cylindrical shape and having a first end (55) and a second end (56). The two-stage drum screen (54) has a first screen (57) of relatively fine mesh toward its first end (55) and a second screen (58) of intermediate sized mesh openings toward its second end (56). The drum screen (54) is rotatable about its longitudinal axis by a motor and belt mechanism (59) and is disposed in a downward sloping position wherein the first end (55) is higher in elevation than the second end (56).

In operation, as the conveyor (52) deposits the beverage containers (11) into the first end (55) of the rotating two-stage drum conveyor (54), the fine particles (11c) drop through the first screen (57) and are collected in a fine particle collecting area (60). If desired, these fine particles can be separated again using a metal separator (discussed below) for example into plastic parts such as plastic rings off bottle caps and aluminum tabs from cans. As the drum screen (54) continues to rotate, the intermediate sized containers (11b) fall through the second screen (58) where they are collected on a first conveyor (62). The large sized containers (11a), which are too large to fall through the second screen (58), continue to rotate within the drum screen (54) until they are discharged out the second end (56) of the downward sloping drum screen (54) onto a second conveyor (64). The large sized containers (11a), typically of the plastic two liter size bottles, are conveyed by the second conveyor (64) to large plastic container collecting area where they may be shredded or baled for recycling or further sorted.

The intermediate sized containers (11b), including both aluminum cans (11b') and plastic bottles (11b"), on the first conveyor (62) are conveyed past a first metal separator (90) which separates a significant portion of the aluminum cans (11b') from the plastic bottles (11b"). The aluminum cans (11b') are repelled by the first metal separator (90) into a first chute (68) while the remaining intermediate sized containers (11b) are deposited onto a third conveyor (70). These remaining intermediate sized containers (11b) are then conveyed past a second metal separator (91) which repels an even more significant portion of aluminum cans (11b') into a second chute (74) The separated aluminum cans (11b') are then carried by the first and second chutes (68 and 74) to a fourth conveyor (72) which conveys the aluminum cans (11b') to an aluminum can collecting area where they may be shredded or baled for shipment to a recycling facility. The metal separators (90 and 91) are discussed in further detail below.

The remaining intermediate sized containers (11b) not repelled by the second metal separator (91) are deposited onto a fifth conveyor (76) and then conveyed past a metal detector (100) that detects if there are any remaining metallic items among the plastic bottles (11b"). If the metal detector (100) detects any metallic objects remaining on the fifth conveyor (76) a signal is sent by the metal detector (100) to activate an air discharge mechanism (101)

(discussed below) which will discharge a burst of air, thereby blowing the metallically contaminated items (11d) onto a sixth conveyer (80). The metallically contaminated items (11d) are then carried by this sixth conveyor (80) and deposited into a third chute (82) where the metallically contaminated items (11d) are discharged back onto the first conveyor (62) where they will be recirculated through the separating apparatus (50) until all metallic and non-metallic items are separated and collected into their respective areas of like materials. The remaining plastic containers (11b"), not removed by the air discharger (101), are conveyed to an intermediate size plastic bottle collecting area where they may be shredded or baled for shipment to a recycling facility.

Figure 6:
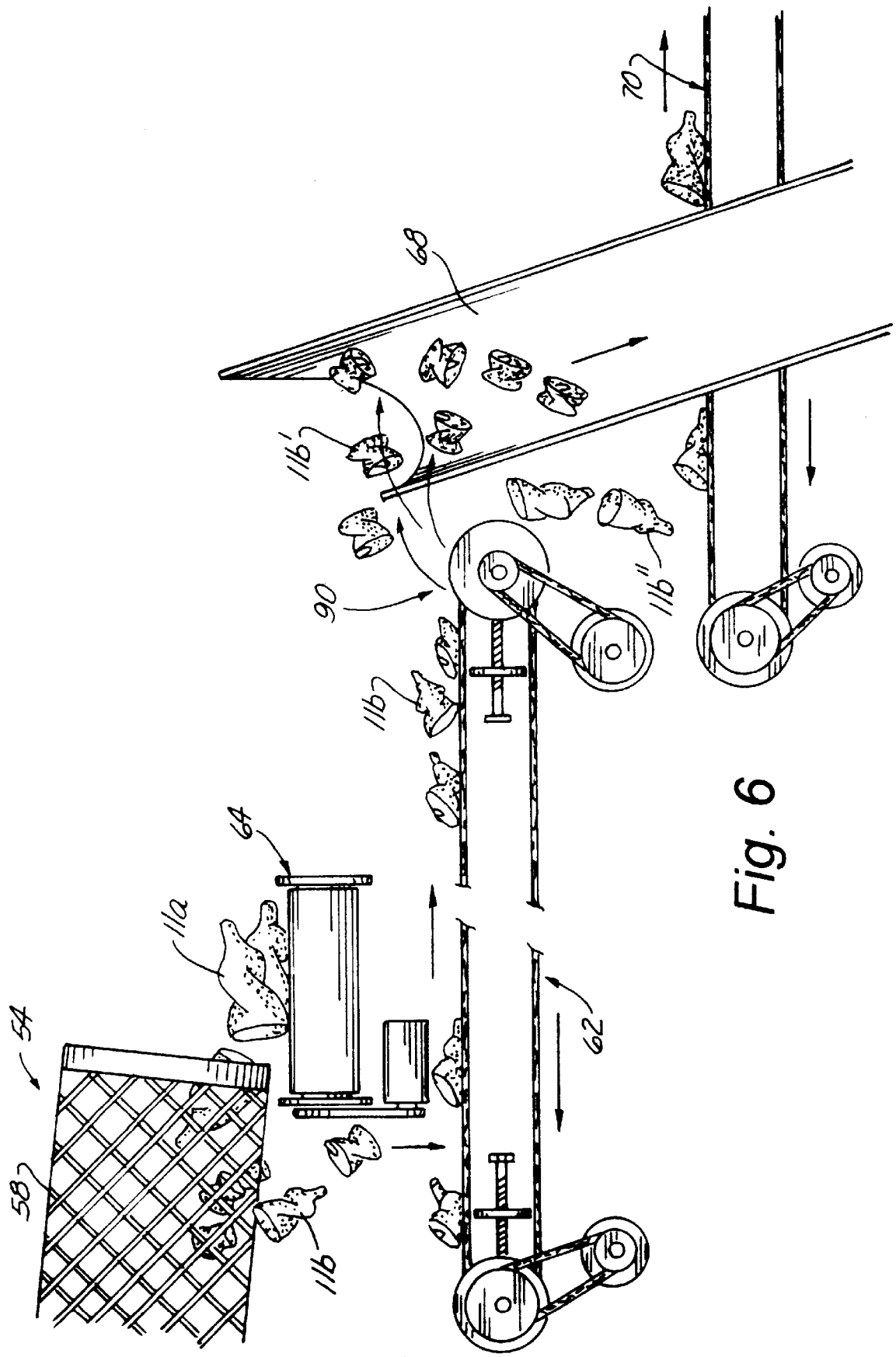
FIG. 6 is a close up view of the size separator and metal separator.
Figure 7:
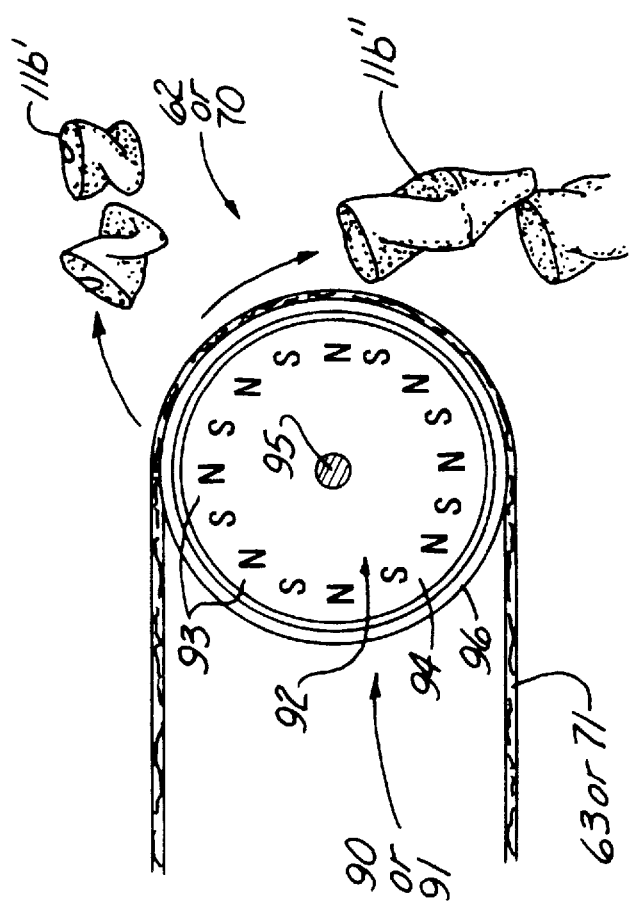
FIG. 7 is a cross sectional view of the metal separator taken along lines 7—7 of FIG. 4.

Referring now to FIG. 6, the first and second metal separators (90 and 91) can, for example, be of a type manufactured by Dings Co. of 4740 W. Electric Avenue, Milwaukee, Wis. 53219. The metal separators (90 and 91) are comprised of a magnetic rotor (92) which includes a series of permanent magnets (93) mounted on a support plate (94) attached to a shaft (95). The magnetic rotor (92) is surrounded by, but not attached to, a ceramic covered fiberglass wear shell (96) which supports the conveyor belts (63 or 71) of the first conveyor (62) or the third conveyor (70) respectively. This allows the magnetic rotor (92) to spin independently and at a much higher speed than the wear shell (96) and the conveyor belts (63 or 71). When a piece of nonferrous metal, such as an aluminum can (11b') passes over the separator (90 or 91), the magnets (93) inside the shell rotate past the aluminum can (11b') at high speed (approximately 2000 rpm). The rotation of the magnets (93) forms eddy currents in the aluminum can (11b') which in turn create a magnetic field around the aluminum can (11b'). The polarity of that magnetic field is the same as the rotating magnet (93), causing the aluminum can (11b') to be repelled away from the magnet (93). This repulsive force makes the trajectory of the aluminum can (11b') greater than that of the nonmetallic plastic bottles (11b"), thereby allowing the aluminum cans (11b') to be separated and deposited into the chutes (68 and 74)

Referring now to FIGS. 8, 9 and 10, the metal detector (100) which can be of the type manufactured by Tectron Metal Detection of Irvine, Calif., and air discharge device (101) are shown positioned toward the end of the fifth conveyor (76). The air discharge device (101) is connected to an air compressor (not shown) having a discharge pipe (102) to carry air into the air discharge device (101). One end of the air discharge pipe (102) having a plurality of discharge ports (103) is positioned under the conveyor belt (77) of the conveyor (76). When the metal detector (100) detects metallically contaminated items (11d) passing below it, a signal is sent to the air discharge device (101) to release, at the proper time, a burst of air through the ports (103) of sufficient force to blow the metallically contaminated items (11d) from the fifth conveyor (76) to the sixth conveyor (80) so that the metallically contaminated items (11d) may be recirculated through the separating process as described above. It should be appreciated that the metal detector (100) and air discharge device (101) may be programmed such that all of the discharge ports (103), or only certain ports (103), will open at the appropriate times to discharge the metallically contaminated items (11d) onto the sixth conveyor (80).

It should also be understood that plastic containers (11b") will often be blown onto the sixth conveyor (80) along with the contaminated items (11d) especially if all the ports (103) discharge an air burst at the same time. These plastic containers are simply recirculated through the separating process until all the containers are sorted into like materials.

Accordingly, it will be appreciated that the preferred embodiment shown herein does indeed accomplish the aforementioned objects. Obviously many modifications and variations of the present invention are possible in light of the above teachings. It is therefore to be understood that, within the scope of the appended claims, the invention may be practiced otherwise than as specifically described.

I claim:

1. A method of collecting and removing recyclable beverage containers from a redemption center and transporting them to a separating facility, said method comprising the steps of:
    (a) collecting aid recyclable beverage containers in a single holding bin at said redemption center;
    (b) blowing said recyclable beverage containers from said holding bin into a transporter; and
    (c) transporting said transporter to said separating facility.

2. The method of claim 1 wherein said recyclable beverage containers include aluminum beverage containers and plastic beverage containers.

3. The method of claim 2 wherein said transporter of said blowing step (b) is attached to a motor vehicle.

4. The method of claim 3 wherein said blowing step (b) includes utilizing a centrifugal fan and a chute to blow said recyclable beverage containers from said holding bin into said transporter.

5. A method of removing recyclable beverage containers from a redemption center and transporting them to a separating facility, said method comprising the steps of:
    (a) passing said recyclable beverage containers through a reverse vending machine wherein said recyclable beverage containers are collected in a hopper;
    (b) depositing said recyclable beverage containers collected in said hopper into a holding bin;
    (c) blowing said recyclable beverage containers from said holding bin into a transporter; and
    (d) transporting said transporter to said separating facility.

6. The method of claim 5 wherein said recyclable beverage containers include aluminum beverage containers and plastic beverage containers.

7. The method of claim 6 wherein said transporter of said blowing step (c) is attached to a motor vehicle.

8. The method of claim 7 wherein said blowing step (c) includes utilizing a centrifugal fan and a chute to blow said recyclable beverage containers from said holding bin into said transporter.

9. A method of collecting and removing aluminum and plastic beverage containers from a redemption center and transporting them to a separating facility, said method comprising the steps of:
    (a) passing said aluminum beverage containers through a first reverse vending machine wherein said aluminum beverage containers are collected in a first hopper;
    (b) passing said plastic beverage containers through a second reverse vending machine wherein said plastic beverage containers are collected in a second hopper;
    (c) depositing said aluminum beverage containers and said plastic beverage containers collected in said first and second hoppers into a single holding bin;
    (d) blowing said aluminum and plastic beverage containers from said holding bin into a transporter; and
    (e) transporting said transporter to sad separating facility.

10. The method of claim 9 wherein said transporter of said blowing step (d) is attached to a motor vehicle.

11. The method of claim 9 wherein said blowing step (d) includes utilizing a centrifugal fan and a chute to blow said aluminum and plastic beverage containers from said holding bin into said transporter.

\* \* \* \* \*